(12) United States Patent
Liao et al.

(10) Patent No.: US 11,061,172 B2
(45) Date of Patent: Jul. 13, 2021

(54) MANUFACTURING METHOD OF ANTI-GLARE FILM

(71) Applicant: E Ink Holdings Inc., Hsinchu (TW)

(72) Inventors: Ching-Huan Liao, Hsinchu (TW);
Hsin-Tao Huang, Hsinchu (TW);
Franklin Chau-Nan Hong, Hsinchu (TW); Cyun-Jhe Yan, Hsinchu (TW);
Wen-De Zheng, Hsinchu (TW);
Yu-Lun Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/232,076

(22) Filed: Dec. 26, 2018

(65) Prior Publication Data

US 2019/0204481 A1 Jul. 4, 2019

(30) Foreign Application Priority Data

Jan. 2, 2018 (TW) .................................. 107100102

(51) Int. Cl.
*G02B 5/02* (2006.01)

(52) U.S. Cl.
CPC .................................. *G02B 5/0268* (2013.01)

(58) Field of Classification Search
CPC .......... G02B 5/0268; G02B 1/10; G02B 1/12; G02B 1/14; B05D 5/02; B05D 1/02
USPC ................................................. 427/162–169
See application file for complete search history.

(56) References Cited

U.S. PATENT DOCUMENTS

| 4,945,282 | A | 7/1990 | Kawamura et al. |
| 6,505,942 | B2 | 1/2003 | Ohishi et al. |
| 8,936,837 | B2 | 1/2015 | Kagawa et al. |
| 8,940,805 | B2 | 1/2015 | Shim et al. |
| 9,086,520 | B2 | 7/2015 | Kodama et al. |
| 9,498,793 | B2 | 11/2016 | Hong et al. |
| 2004/0091642 | A1* | 5/2004 | Murakami ........... G02B 5/0215 428/1.31 |
| 2008/0192353 | A1* | 8/2008 | Nagahama .......... B29C 37/0053 359/599 |
| 2016/0038972 | A1* | 2/2016 | Lu ........................... B05D 5/06 428/141 |
| 2016/0131822 | A1* | 5/2016 | Tai ...................... G02B 6/0076 362/612 |

(Continued)

FOREIGN PATENT DOCUMENTS

| CN | 1501100 A | 6/2004 |
| CN | 107074626 A | 8/2017 |

(Continued)

OTHER PUBLICATIONS

Che-Wen Chiang et al., "Design and demonstration of high efficiency anti-glare LED luminaires for indoor lighting," Optics Express, vol. 23, No. 3, Feb. 2015.

(Continued)

*Primary Examiner* — Elizabeth A Burkhart
(74) *Attorney, Agent, or Firm* — CKC & Partners Co., LLC

(57) ABSTRACT

A manufacturing method of an anti-glare film is provided. The manufacturing method includes spraying a solution on a substrate to form a plurality of droplets on the substrate, wherein the solution includes a curable resin, a plurality of particles, and a solvent; and curing the plurality of droplets to form an anti-glare film.

6 Claims, 5 Drawing Sheets

(56) References Cited

U.S. PATENT DOCUMENTS

2016/0326047 A1* 11/2016 Mototani ................ C03C 17/30
2017/0197875 A1* 7/2017 Fujii ....................... C03C 17/42

FOREIGN PATENT DOCUMENTS

TW     I400484 B    7/2013
TW     I586617 B    6/2017

OTHER PUBLICATIONS

Chao-Ching Chang et al., "Preparation of polymer/silica composite antiglare coatings on poly(ethylene terphathalate) (PET) substrates," Journal of Coatings Technology and Research, 2012.
Corresponding Taiwan office action dated Sep. 12, 2018.
Corresponding Chinese office action dated Apr. 24, 2020.

* cited by examiner

MANUFACTURING METHOD OF ANTI-GLARE FILM

CROSS-REFERENCE TO RELATED APPLICATION

This application claims priority to Taiwan Application Serial Number 107100102, filed Jan. 2, 2018, which is herein incorporated by reference in its entirety.

BACKGROUND

Field of Invention

The present invention relates to a manufacturing method of an anti-glare film. More particularly, the present invention relates to a method of manufacturing an anti-glare film by spraying a solution including a curable resin and particles on a substrate.

Description of Related Art

Glare would cause problems of visual discomfort, visual fatigue, or reducing visibility. Therefore, it is usually to dispose an anti-glare film on a surface of a display device for achieving anti-glare effect. However, in the traditional methods of manufacturing anti-glare films, the dispersibility of the composition of the anti-glare material is poor, thereby causing the final manufactured anti-glare films have higher haze and thus lose transparency.

In view of the foregoing, it is currently in need of a new method of manufacturing an anti-glare film.

SUMMARY

The present disclosure provides a manufacturing method of an anti-glare film. The manufacturing method includes the following operations: spraying a solution on a substrate to form a plurality of droplets on the substrate, wherein the solution includes a curable resin, a plurality of particles, and a solvent; curing the plurality of droplets to form an anti-glare film.

In some embodiments, the substrate is a hard coating layer or a light guide plate.

In some embodiments, the substrate is a composite substrate including a light guide plate and a hard coating layer.

In some embodiments, the light guide plate has a first refractive index, the hard coating layer has a second refractive index, and the first refractive index is greater than the second refractive index.

In some embodiments, spraying the solution is performed by spraying the solution with a spray gun, and a distance between a nozzle of the spray gun and the substrate is in a range between 15 cm to 35 cm.

In some embodiments, an air pressure in the spray gun is in a range between 1 $kg/cm^2$ to 5 $kg/cm^2$.

In some embodiments, the plurality of particles include an inorganic particle, an organic particle, or a combination thereof.

In some embodiments, the solution includes 0.5 to 2 parts by weight of the curable resin, 0.05 to 0.5 parts by weight of the plurality of particles, and 3 to 10 parts by weight of the solvent.

In some embodiments, the curable resin is a photo-curable resin or a heat-curable resin.

In some embodiments, curing the plurality of droplets to form the anti-glare film is performed by irradiating the plurality of droplets with a UV light or heating the plurality of droplets.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
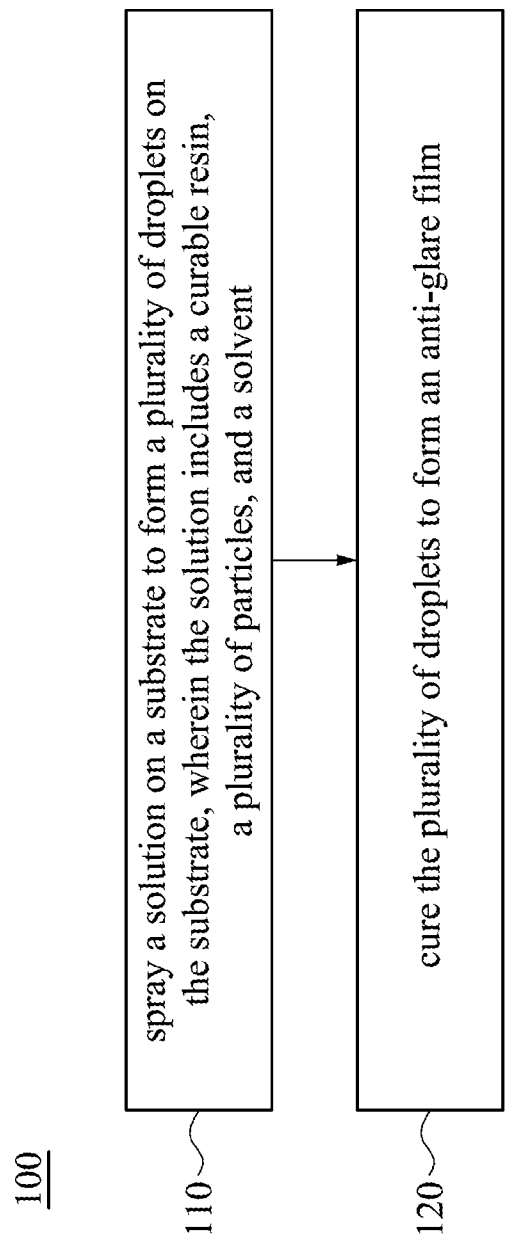
FIG. 1 is a manufacturing method of an anti-glare film according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations.

Although below using a series of actions or steps described in this method disclosed, but the order of these actions or steps shown should not be construed to limit the present invention. For example, certain actions or steps may be performed in different orders and/or concurrently with other steps. Moreover, not all steps must be performed in order to achieve the depicted embodiment of the present invention. Furthermore, each operation or procedure described herein may contain several sub-steps or actions.

Figure 2:
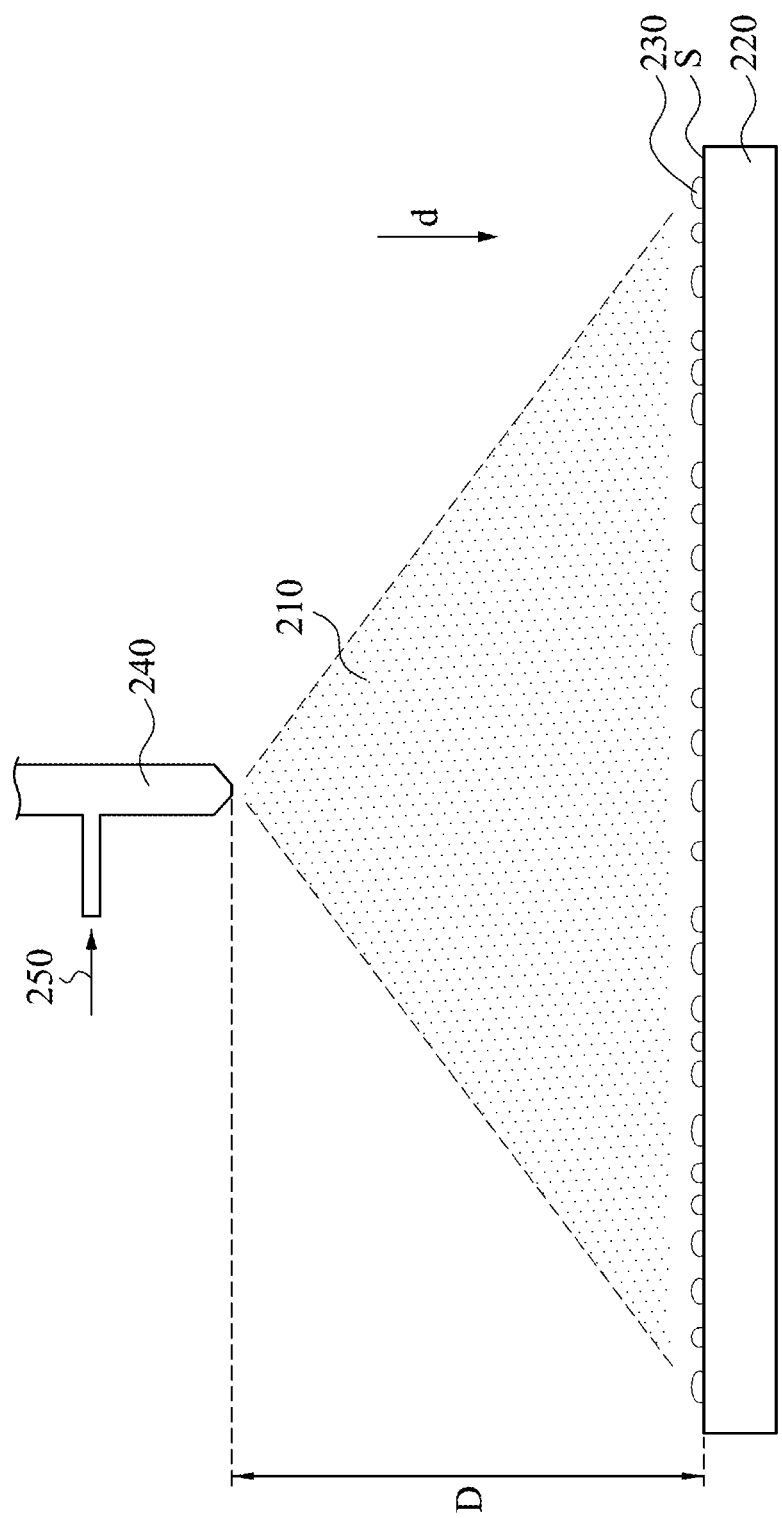
FIGS. 2-5 show cross-section views of an anti-glare film at different manufacturing stages according to some embodiments of the present disclosure.
Figure 3:
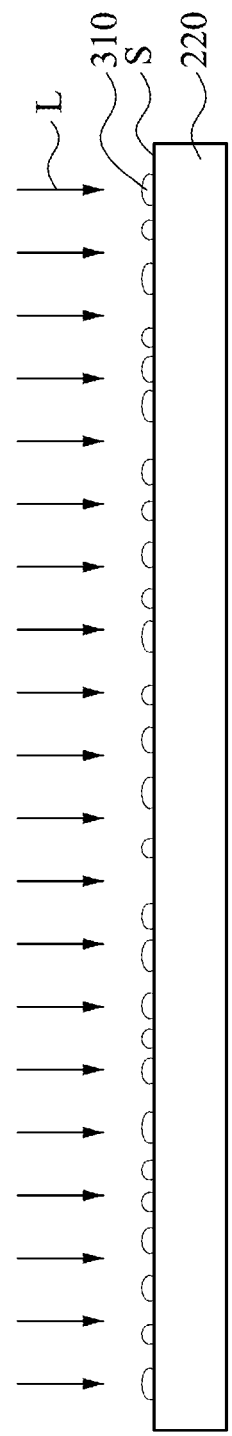

The present disclosure provides a manufacturing method of an anti-glare film. Please refer to FIG. 1 and FIG. 2 and FIG. 3 simultaneously. FIG. 1 is a manufacturing method 100 of an anti-glare film according to some embodiments of the present disclosure. The manufacturing method 100 includes operation 110 and operation 120. FIG. 2 and FIG. 3 show cross-section views of an anti-glare film at different manufacturing stages according to some embodiments of the present disclosure.

In the operation 110, please refer to FIG. 2. A solution 210 is sprayed on a substrate 220 to form a plurality of droplets 230 on the substrate 220, wherein the solution 210 includes a curable resin, a plurality of particles, and a solvent. Specifically, during the process of spraying the solution 210, the solution 210 is nebulized, and the particles are evenly dispersed in the nebulized solution 210. By adjusting the nebulization parameters, such as the distance between the place spraying out the solution 210 and the substrate 220, the solution composition, and solution viscosity, the size of the droplets 230 can be adjusted.

In some embodiments, the substrate 220 is a hard coating layer or a light guide plate. In some embodiments, the material of the substrate 220 includes glass, polymethylmethacrylate (PMMA), cyclo-olefin polymer (COP), polycarbonate (PC), polyethylene terephthalate (PET), cyclic olefin copolymer (COC), polyethylene (PE), polyetheretherketone (PEEK), polyethylene naphthalate (PEN), polyimide (PI), polyetherimide (PEI), epoxy resin, polyether resin, phenolic resin, or a combination thereof.

In some embodiments, the curable resin is a photo-curable resin or a heat-curable resin. For example, the photo-curable resin is UV curable resin. UV curable resin includes epoxy acrylic resin, polyurethane acrylic resin, polyester acrylic resin, polyether acrylic resin, acrylic resin, vinyl ester resin, or a combination thereof.

In some embodiments, the particles include an inorganic particle, an organic particle, or a combination thereof. For example, the material of the inorganic particle includes but not limited to $SiO_2$, $TiO_2$, $SnO_2$, $ZrO_2$, $Al_2O_3$, $In_2O_3$, $Sb_2O_3$, $MgF_2$, ZnO, and ITO. For example, the material of the organic particle includes but not limited to polymethylmethacrylate resin powder, organosilicon resin powder, polycarbonate resin powder, polyester resin powder, styrene acrylates resin powder, polystyrene resin powder, benzoguanamine resin powder, polyolefin resin powder, polyamide resin powder, polyimide resin powder, and polyfluoroethylene resin powder. In some embodiments, the particles are nanoparticles. In some embodiments, an average particle size of the particles is between 0.2 μm to 10 μm.

In some embodiments, the solvent is alkane, cycloalkane, alcohol, ether, ester, aromatic compound. For example, the solvent includes methanol, ethanol, isopropanol, butanol, ethylene glycol, diacetone alcohol, 2-ethoxyethanol, 2-methoxyethanol, 2-butoxyethanol, propylene glycol monomethyl ether, hexane, heptane, cyclohexane, acetylacetone, dimethyl ketone, methyl ethyl ketone, methyl isobutyl ketone, toluene, benzene, xylene, methyl acetate, ethyl acetate, butyl acetate, dimethylformamide, tetrahydrofurane, or a combination thereof.

In some embodiments, the solution 210 includes 0.5 to 2 parts by weight of the curable resin, 0.05 to 0.5 parts by weight of the particles, and 3 to 10 parts by weight of the solvent. By adjusting the weight ratio between the curable resin, the particles, and the solvent in the solution 210, the nebulization effect of spraying the solution 210 can be adjusted, and thereby adjusting the size of the droplets 230.

In some embodiments, the operation 110 is performed by spraying the solution 210 with a spray gun 240. More specifically, an air 250 is flowed into the spray gun 240, and therefore when the solution 210 and the air 250 are sprayed out from the nozzle of the spray gun 240, the solution 210 can be nebulized. In some embodiments, an air pressure in the spray gun 240 is in a range between 1 $kg/cm^2$ to 5 $kg/cm^2$. For example, the air pressure is 2 $kg/cm^2$, 3 $kg/cm^2$, or 4 $kg/cm^2$. By adjusting the value of the air pressure, the nebulization effect of spraying the solution 210 can be adjusted. In some embodiments, a distance D between the nozzle of the spray gun 240 and the substrate 220 is in a range between 15 cm to 35 cm. By adjusting the value of the distance D, the size of the droplets 230 can be adjusted. In some embodiments, a spray direction d of spraying out the solution 210 with the spray gun 240 is perpendicular to a surface S of the substrate 220.

In the operation 120, please refer to FIG. 3. The droplets 230 are cured to form an anti-glare film 310. Therefore, it can be known that the roughness of the anti-glare film 310 can be adjusted by the size of the droplets 230. In some embodiments, the operation 120 is performed by irradiating the droplets 230 with a UV light L. In some other embodiments, the operation 120 is performed by heating the droplets 230.

Figure 4:
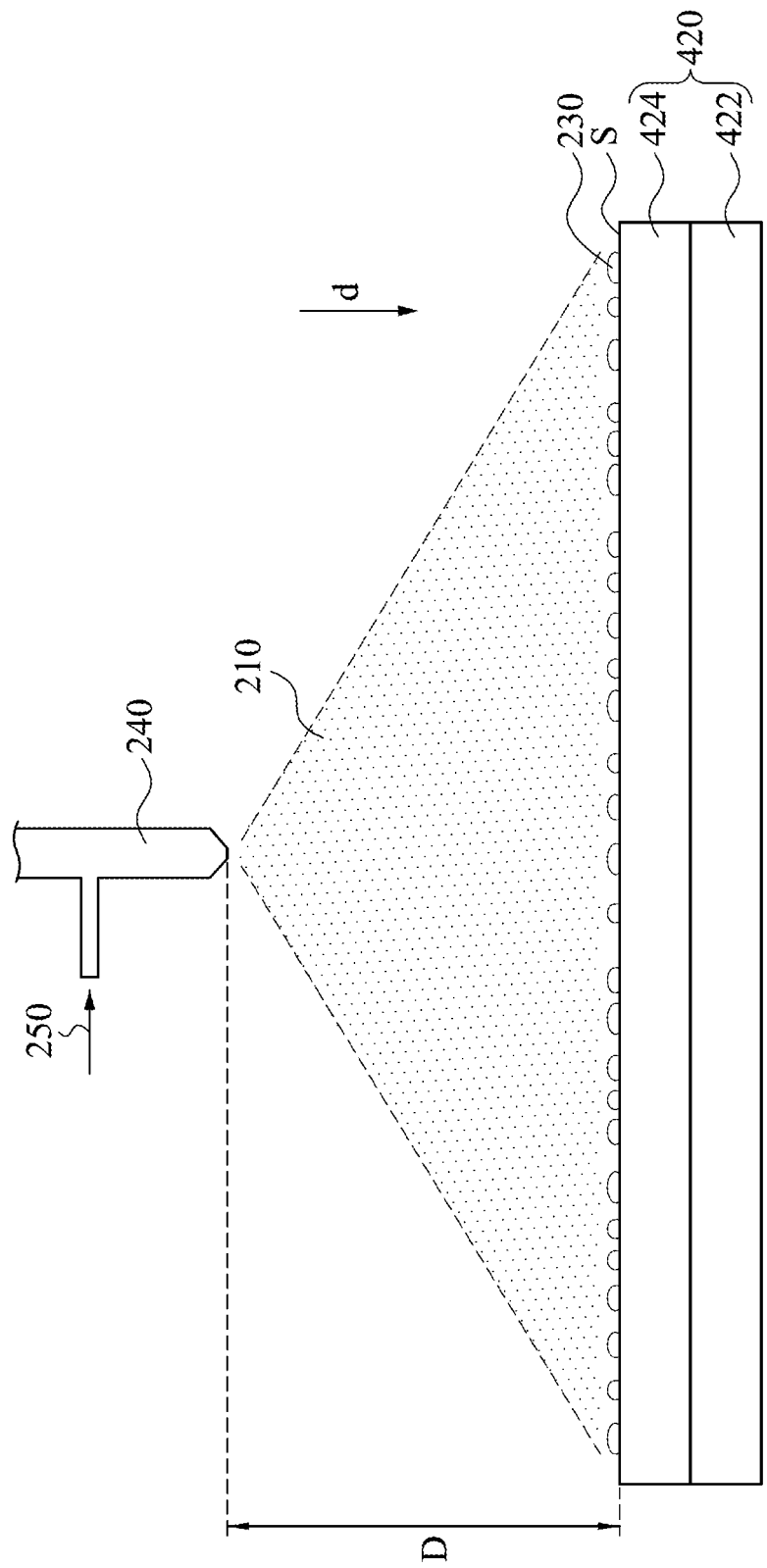
Figure 5:
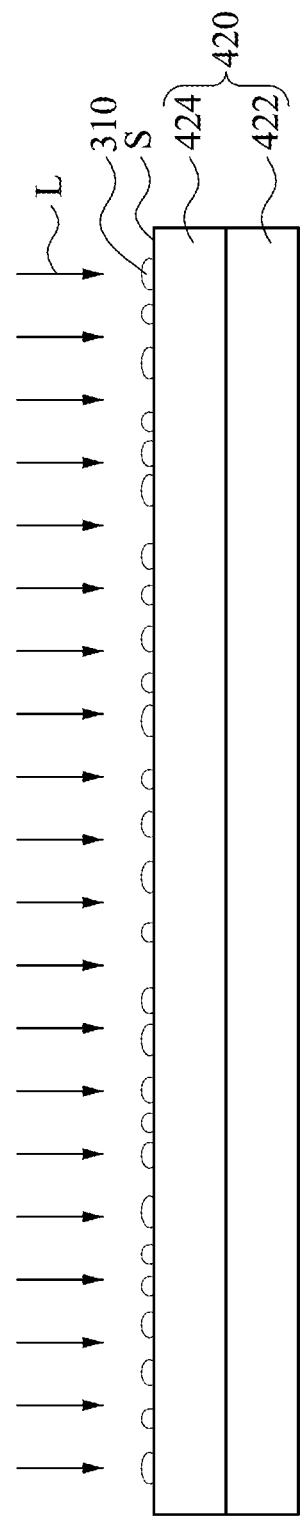

The present disclosure provides another manufacturing method of an anti-glare film. Please refer to FIG. 1 and FIGS. 4 and 5 simultaneously. FIG. 4 and FIG. 5 show cross-section views of the anti-glare film 310 at different manufacturing stages according to some other embodiments of the present disclosure.

In the operation 110, please refer to FIG. 4. The solution 210 is sprayed on a substrate 420 to form the plurality of droplets 230 on the substrate 420, wherein the solution 210 includes the curable resin, the plurality of particles, and the solvent. The substrate 420 is a composite substrate including a light guide plate 422 and a hard coating layer 424, wherein the hard coating layer 424 is on the light guide plate 422. The difference between FIG. 4 and FIG. 2 is that the substrate 420 of FIG. 4 is a composite substrate, but the substrate 220 of FIG. 2 is a single-layer substrate.

In some embodiment, the light guide plate 422 has a first refractive index, the hard coating layer 424 has a second refractive index, and the first refractive index is greater than the second refractive index.

In the operation 120, please refer to FIG. 5. The droplets 230 are cured to form the anti-glare film 310.

It can be known from the above manufacturing method that the manufacturing method of the anti-glare film 310 of the present disclosure is quite simple. Moreover, because the solution 210 is nebulized during the process of spraying the solution 210, and therefore the particles are evenly dispersed in the nebulized solution 210, particle agglomeration is not easy to happen in the droplets 230 on the substrate 220. Accordingly, the final formed anti-glare film 310 would have low haze and high transparency. Moreover, by adjusting the size of the droplets 230, the roughness of the anti-glare film 310 can be easily adjusted, and therefore the haze and transmittance of the anti-glare film 310 can be easily adjusted.

The following examples are used to explain the specific aspects of the invention, and therefore one skilled in the art can implement the invention. However, the following examples are not intended to limit the invention.

Experiment 1: Property Test of Anti-Glare Films Manufactured Under Different Air Pressures A plurality of droplets are formed on a substrate by spraying a solution with a spray gun. The solution includes 1 parts by weight of UV curable resin, 0.1 parts by weight of polymethylmethacrylate resin powder, and 5 parts by weight of isopropanol. Next, the droplets are cured by a UV light to form an anti-glare film. The air pressures in the spray gun of Examples 1-3 are different. Please refer to the following Table 1 for the haze and transmittance of each anti-glare film.

TABLE 1

| | Example 1 | Example 2 | Example 3 |
|---|---|---|---|
| Air pressure ($kg/cm^2$) | 1.5 | 2.5 | 3.5 |
| Number of spraying | 1 | 1 | 1 |
| Haze (%) | 12.42 | 16.92 | 26.02 |
| Transmittance (%) | 91.20 | 91.28 | 91.31 |

It can be seen from Table 1 that the anti-glare films manufactured by Examples 1-3 all have high transmittance and low haze. Moreover, when the air pressure is lower, the anti-glare film would have lower haze.

Experiment 2: Property Test of Anti-Glare Films Manufactured Under Different Number of Spraying The experimental operations of Example 4 are similar to that of Example 1. The difference is that the number of spraying of Example 1 is one, but the number of spraying of Example 4 is two. Please refer to the following Table 2 for the haze and transmittance of each anti-glare film.

TABLE 2

|  | Example 1 | Example 4 |
| --- | --- | --- |
| Air pressure (kg/cm$^2$) | 1.5 | 1.5 |
| Number of spraying | 1 | 2 |
| Haze (%) | 12.42 | 20.04 |
| Transmittance (%) | 91.20 | 91.41 |

It can be seen from Table 2 that, when the number of spraying is fewer, the anti-glare film would have lower haze.

Experiment 3: Property Test of Anti-Glare Films Manufactured from Solutions with Different Concentration of UV Curable Resin The experimental operations of Example 5 are similar to that of Example 1. The difference is that Example 1 uses 1 parts by weight of UV curable resin, but Example 5 uses 0.5 parts by weight of UV curable resin. Please refer to the following Table 3 for the haze and transmittance of each anti-glare film.

TABLE 3

|  | Example 1 | Example 5 |
| --- | --- | --- |
| UV curable resin (parts by weight) | 1 | 0.5 |
| Air pressure (kg/cm$^2$) | 1.5 | 1.5 |
| Number of spraying | 1 | 1 |
| Haze (%) | 12.42 | 28.78 |
| Transmittance (%) | 91.20 | 91.37 |

It can be seen from Table 3 that, when the concentration of UV curable resin of solution is higher, the anti-glare film would have lower haze.

In view of the foregoing, the present disclosure provides simple manufacturing methods of the anti-glare films. Moreover, the anti-glare films manufactured by the above manufacturing methods would have low haze and high transmittance.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A manufacturing method of an anti-glare film, comprising:
    spraying a solution on a substrate to form a plurality of discrete droplets on the substrate, wherein the solution comprises 0.5 to 2 parts by weight of a curable resin, 0.05 to 0.5 parts by weight of a plurality of particles, and 3 to 10 parts by weight of a solvent; and
    curing the plurality of the discrete droplets on the substrate to form a plurality of discrete anti-glare structures on the substrate, whereby forming an anti-glare film, wherein the substrate is a composite substrate comprising a light guide plate and a hard coating layer, the light guide plate has a first refractive index, the hard coating layer has a second refractive index, and the first refractive index is greater than the second refractive index.

2. The manufacturing method of claim 1, wherein spraying the solution is performed by spraying the solution with a spray gun, and a distance between a nozzle of the spray gun and the substrate is in a range between 15 cm to 35 cm.

3. The manufacturing method of claim 2, wherein an air pressure in the spray gun is in a range between 1 kg/cm$^2$ to 5 kg/cm$^2$.

4. The manufacturing method of claim 1, wherein the plurality of particles comprise an inorganic particle, an organic particle, or a combination thereof.

5. The manufacturing method of claim 1, wherein the curable resin is a photo-curable resin or a heat-curable resin.

6. The manufacturing method of claim 1, wherein curing the plurality of discrete droplets to form the anti-glare film is performed by irradiating the plurality of discrete droplets with a UV light or heating the plurality of discrete droplets.

* * * * *